(12) United States Patent
Inoue et al.

(10) Patent No.: US 9,878,605 B2
(45) Date of Patent: Jan. 30, 2018

(54) POWER TRANSMISSION SYSTEM FOR HYBRID VEHICLE

(71) Applicants: Yuji Inoue, Nissin (JP); Yukihiko Ideshio, Nissin (JP); Yousuke Michikoshi, Miyoshi (JP); Daiki Suyama, Okazaki (JP); Naoya Jinnai, Anjo (JP); Kensuke Wada, Anjo (JP)

(72) Inventors: Yuji Inoue, Nissin (JP); Yukihiko Ideshio, Nissin (JP); Yousuke Michikoshi, Miyoshi (JP); Daiki Suyama, Okazaki (JP); Naoya Jinnai, Anjo (JP); Kensuke Wada, Anjo (JP)

(73) Assignees: TOYOTA JIDOSHA KABUSHIKI KAISHA, Toyota (JP); AISIN AW CO., LTD., Anjo-shi (JP)

( * ) Notice: Subject to any disclaimer, the term of this patent is extended or adjusted under 35 U.S.C. 154(b) by 340 days.

(21) Appl. No.: 14/779,589

(22) PCT Filed: Mar. 13, 2014

(86) PCT No.: PCT/IB2014/000311
§ 371 (c)(1),
(2) Date: Sep. 24, 2015

(87) PCT Pub. No.: WO2014/155169
PCT Pub. Date: Oct. 2, 2014

(65) Prior Publication Data
US 2016/0052379 A1 Feb. 25, 2016

(30) Foreign Application Priority Data
Mar. 25, 2013 (JP) .................... 2013-062501

(51) Int. Cl.
*F16H 47/00* (2006.01)
*B60K 6/00* (2006.01)
(Continued)

(52) U.S. Cl.
CPC ............... *B60K 6/22* (2013.01); *B60K 6/387* (2013.01); *B60K 6/405* (2013.01); *B60K 6/48* (2013.01);
(Continued)

(58) Field of Classification Search
CPC .................................. B60K 6/20; F16H 47/00
(Continued)

(56) References Cited

U.S. PATENT DOCUMENTS 4,708,032 A * 11/1987 Harada .............. B60K 23/0808
180/247
5,010,991 A * 4/1991 Tsukamoto .......... F16H 61/143
192/3.3
(Continued)

FOREIGN PATENT DOCUMENTS

JP 2006-137406 A 6/2006
JP 2010-196867 A 9/2010
(Continued)

*Primary Examiner* — Ha Dinh Ho
(74) *Attorney, Agent, or Firm* — Oliff PLC

(57) ABSTRACT

A power transmission system (10) for a hybrid vehicle, the power transmission system (10) includes a transmission (TM, 20), a clutch (18), a motor (MG), an engine (14), a first oil pump (44), a second oil pump (68), a first hydraulic circuit in which the first oil pump (44) is provided, and a second hydraulic circuit in which the second oil pump (68) is provided. The motor (MG) is connected to a driving wheel (26) through the transmission (TM, 20). The engine (14) is connected to the motor (MG) through the clutch (28). The first oil pump (44) supplies oil to the transmission (20). The second oil pump (68) supplies oil to the motor (MG) and the clutch (28). The second hydraulic circuit is independent from the first hydraulic circuit. Selected drawing.

4 Claims, 5 Drawing Sheets

(51) Int. Cl.
  *B60K 6/22* (2007.10)
  *B60K 6/387* (2007.10)
  *B60K 6/48* (2007.10)
  *B60K 6/547* (2007.10)
  *F16H 57/04* (2010.01)
  *F16H 61/00* (2006.01)
  *B60K 6/405* (2007.10)
  *B60L 3/00* (2006.01)
  *B60L 11/14* (2006.01)
  *B60L 15/20* (2006.01)

(52) U.S. Cl.
  CPC ............ *B60K 6/547* (2013.01); *B60L 3/0023* (2013.01); *B60L 3/0061* (2013.01); *B60L 11/14* (2013.01); *B60L 15/2054* (2013.01); *F16H 57/0441* (2013.01); *F16H 57/0445* (2013.01); *F16H 57/0446* (2013.01); *F16H 57/0476* (2013.01); *F16H 61/0025* (2013.01); *F16H 61/0031* (2013.01); *B60L 2220/50* (2013.01); *B60L 2240/12* (2013.01); *B60L 2240/36* (2013.01); *B60L 2240/423* (2013.01); *B60L 2240/443* (2013.01); *B60L 2240/486* (2013.01); *B60L 2240/507* (2013.01); *Y02T 10/6221* (2013.01); *Y02T 10/641* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/902* (2013.01)

(58) Field of Classification Search
  USPC ....................................... 74/661, 335, 730.1
  See application file for complete search history.

(56) References Cited

U.S. PATENT DOCUMENTS

| | | |
|---|---|---|
| 5,415,603 A | 5/1995 | Tuzuki et al. |
| 2010/0319335 A1* | 12/2010 | Schneider ............... F15B 21/00 60/327 |

FOREIGN PATENT DOCUMENTS

| | | |
|---|---|---|
| JP | 2011-126320 A | 6/2011 |
| JP | 2012-111366 A | 6/2012 |

* cited by examiner

POWER TRANSMISSION SYSTEM FOR HYBRID VEHICLE

BACKGROUND OF THE INVENTION

1. Field of the Invention

The invention relates to a power transmission system for a hybrid vehicle, and particularly to an improvement of a hydraulic circuit that supplies oil for controlling, lubricating, and cooling a clutch, a motor, a transmission, and so on.

2. Description of Related Art

A power transmission system for a hybrid vehicle has been proposed, which includes a motor connected to a driving wheel through a transmission, and an engine connected to the motor through a clutch. A system described in Japanese Patent Application Publication No. 2012-111366 A (JP 2012-111366 A) is one example of such a power transmission system for a hybrid vehicle. The system generates hydraulic pressure by using a first oil pump connected to a pump impeller of a torque converter, and supplies oil for controlling, lubricating, and cooling to the transmission, the motor, and the clutch. The system also includes a second oil pump that suctions oil from an oil pan provided below the motor, and, forwards the oil to the first oil pump side. Japanese Patent Application Publication No. 2006-137406 A (JP 2006-137406 A) describes a technology for disengaging a clutch by using hydraulic pressure from an electric oil pump provided separately from the first oil pump.

SUMMARY OF THE INVENTION

However, in JP 2012-111366 A, oil is supplied to the entire power transmission system including the motor, the clutch, and the transmission by the first oil pump only. Therefore, designs of the hydraulic circuit and so on are complex. This means that the hybrid vehicle has a structure in which a module for a hybrid vehicle having the motor and the clutch is arranged between the conventional transmission and engine. Therefore, it is necessary to newly provide an oil passage to supply oil to the module for a hybrid vehicle from the conventional transmission. Thus, a large design change is required for the conventional transmission. Since it is necessary to integrate the transmission and the module for a hybrid vehicle to design a hydraulic circuit, a degree of design freedom is limited.

Meanwhile, in the case of JP 2006-137406 A where the clutch is disengaged by using the electric oil pump provided separately, it is generally difficult for the electric oil pump to ensure an amount of oil required for lubricating and cooling the motor and the clutch. Therefore, when lubricating and cooling the motor and the clutch with oil, it is normal to introduce oil from the first oil pump. Thus, JP 2006-137406 A has the similar problem to that of JP 2012-111366 A.

The present invention improves a degree of freedom for designing a hydraulic circuit that supplies oil for controlling, lubricating, and cooling a transmission, a motor, and a clutch in a hybrid vehicle in which the motor and the clutch are arranged between the transmission and the engine.

A power transmission system for a hybrid vehicle according to an aspect of the present invention, the power transmission system includes a transmission, a clutch, a motor, an engine, a first oil pump, a second oil pump, a first hydraulic circuit in which the first oil pump is provided, and a second hydraulic circuit in which the second oil pump is provided. The motor is connected to a driving wheel through the transmission. The engine is connected to the motor through the clutch. The first oil pump supplies oil to the transmission. The second oil pump supplies oil to the motor and the clutch. The second hydraulic circuit is independent from the first hydraulic circuit.

In the power transmission system for a hybrid vehicle according to the aspect of the present invention, the first oil pump that supplies oil to the transmission, and the second oil pump that supplies oil to the motor and the clutch are provided separately from each other. Therefore, it is possible that the first hydraulic circuit, which supplies oil to the transmission from the first oil pump, and the second hydraulic circuit, which supplies oil to the motor and the clutch from the second oil pump, are structured separately and independently from each other. Thus, a degree of design freedom for the hydraulic circuits is expanded. It becomes possible that a module for a hybrid vehicle having the motor and the clutch, as well as the hydraulic circuit, is structured separately and independently. Workability is thus improved when assembling the module for a hybrid vehicle to the transmission. Design changes for the conventional transmission are unnecessary or reduced greatly. Also, hybridization is easily applied to various types of transmissions.

In the power transmission system for a hybrid vehicle according the aspect of the present invention, the second oil pump may be connected to the motor and may be driven by the motor.

In this case, since the second oil pump is connected to the motor and is driven by the motor, the second oil pump is able to generate hydraulic pressure even in a state where the clutch is disconnected. Compared to a case where a large-sized electric oil pump having a dedicated electric motor is provided, costs are reduced substantially. The power transmission system is downsized and very easily mounted, and is able to ensure generation of hydraulic pressure even at low temperature. In addition, the power transmission system is highly reliable as a possibility of failures due to disconnection and so on is reduced.

In the power transmission system for a hybrid vehicle according to the aspect of the present invention, the second oil pump may be provided at a position where at least a part of the second oil pump overlaps the motor in an axis direction of the motor.

In this case, since the second oil pump is provided at a position where the second oil pump overlaps the motor in an axis direction of the motor, an increase in an axial dimension is prevented.

The power transmission system for a hybrid vehicle according to the aspect of the present invention includes a torque converter provided between the motor and the transmission. The second oil pump may be provided at a position where at least a part of the second oil pump overlaps the torque converter in an axis direction of the torque converter. In this case, since second oil pump may be provided at a position where the second oil pump overlaps the torque converter in an axis direction of the torque converter, an increase in an axial dimension is prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
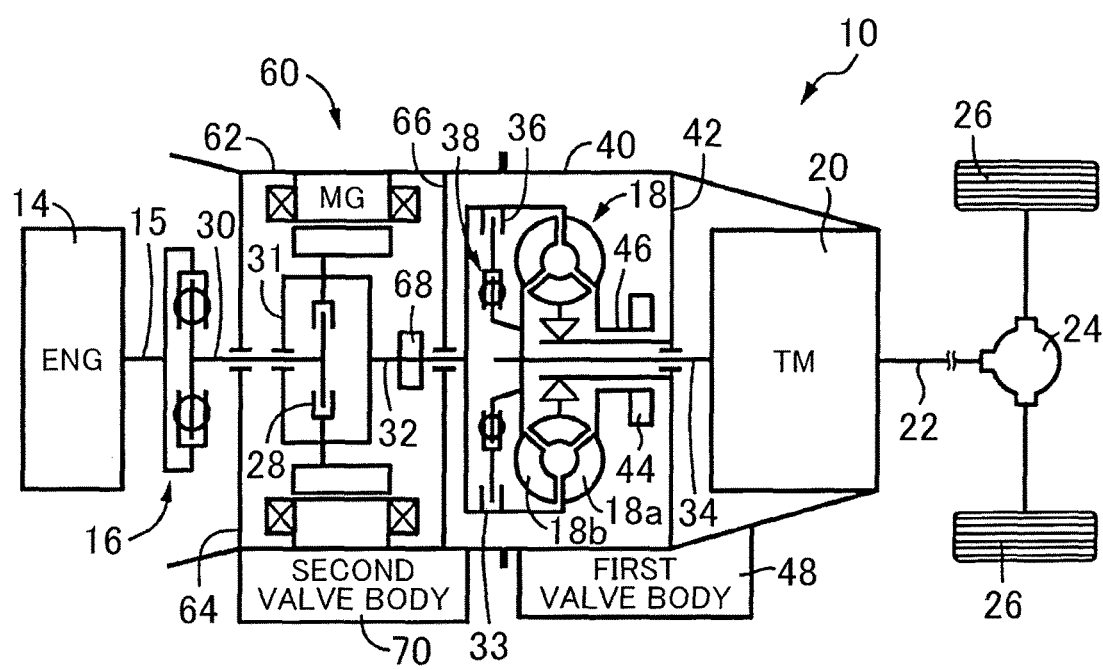
FIG. 1 is an outline view for explaining a rough structure of a power transmission system for a hybrid vehicle according to a first embodiment of the present invention.

Embodiments of the present invention will be explained with reference to the drawings. First of all, a first embodiment of the present invention is explained. FIG. 1 is an outline view for explaining a rough structure of a power transmission system for a hybrid vehicle according to the first embodiment of the present invention, and is an example for FR (front engine, rear drive). The power transmission system 10 is provided with a damper gear 16, a motor generator MG, a torque converter 18, and a transmission (TM) 20 coaxially in this order from an engine (ENG) 14 side, and driving power is transmitted from the transmission 20 to the propeller shaft 22, and to right and left driving wheels 26 through a differential gear mechanism 24. The damper gear 16 is connected to a crankshaft 15 of the engine 14, and a K0 clutch 28 is provided between the damper gear 16 and the motor generator MG as a connection/disconnection device that connects and disconnects power transmission, so that it is possible to separate the engine 14 off from a power transmission path. The K0 clutch 28' is a wet multiple disc clutch that is frictionally engaged by hydraulic pressure. The K0 clutch 28 is connected to the damper gear 16 through a first connecting shaft 30, housed in a space formed by a support plate 31 and so on arranged integrally with a rotor of the motor generator MG, and is lubricated and cooled by oil. The motor generator MG is selectively used as a motor and a generator. In the first embodiment, the motor generator MG and the engine 14 are used as driving power sources for running, and the motor generator MG is connected to the torque converter 18 through a second connecting shaft 32. The motor generator MG corresponds to a motor.

The torque converter 18 includes a pump impeller 18a connected to the second connecting shaft 32 through a TC housing 33, and a turbine wheel 18b connected to an input shaft 34 of the transmission 20. The torque converter 18 is a fluid transmission device that amplifies torque of driving power, which is inputted in the pump impeller 18a, and transmits the driving power to the turbine wheel 18b through oil. A lock-up clutch 36 is provided between the TC housing 33 and the input shaft 34, and the second connecting shaft 32 and the input shaft 34 are thus connected directly through a damper gear 38. The lock-up clutch 36 is a hydraulic frictional engagement device that is engaged, disengaged, or slip-engaged by hydraulic pressure. Also, the transmission 20 is a planetary gear-type stepped automatic transmission in which a plurality of gears is established, the plurality of gears having different transmission gear ratios depending on engagement and disengagement states of a plurality of clutches and brakes. The clutches and the brakes are hydraulic frictional engagement devices that are engaged by hydraulic pressure.

Figure 2:
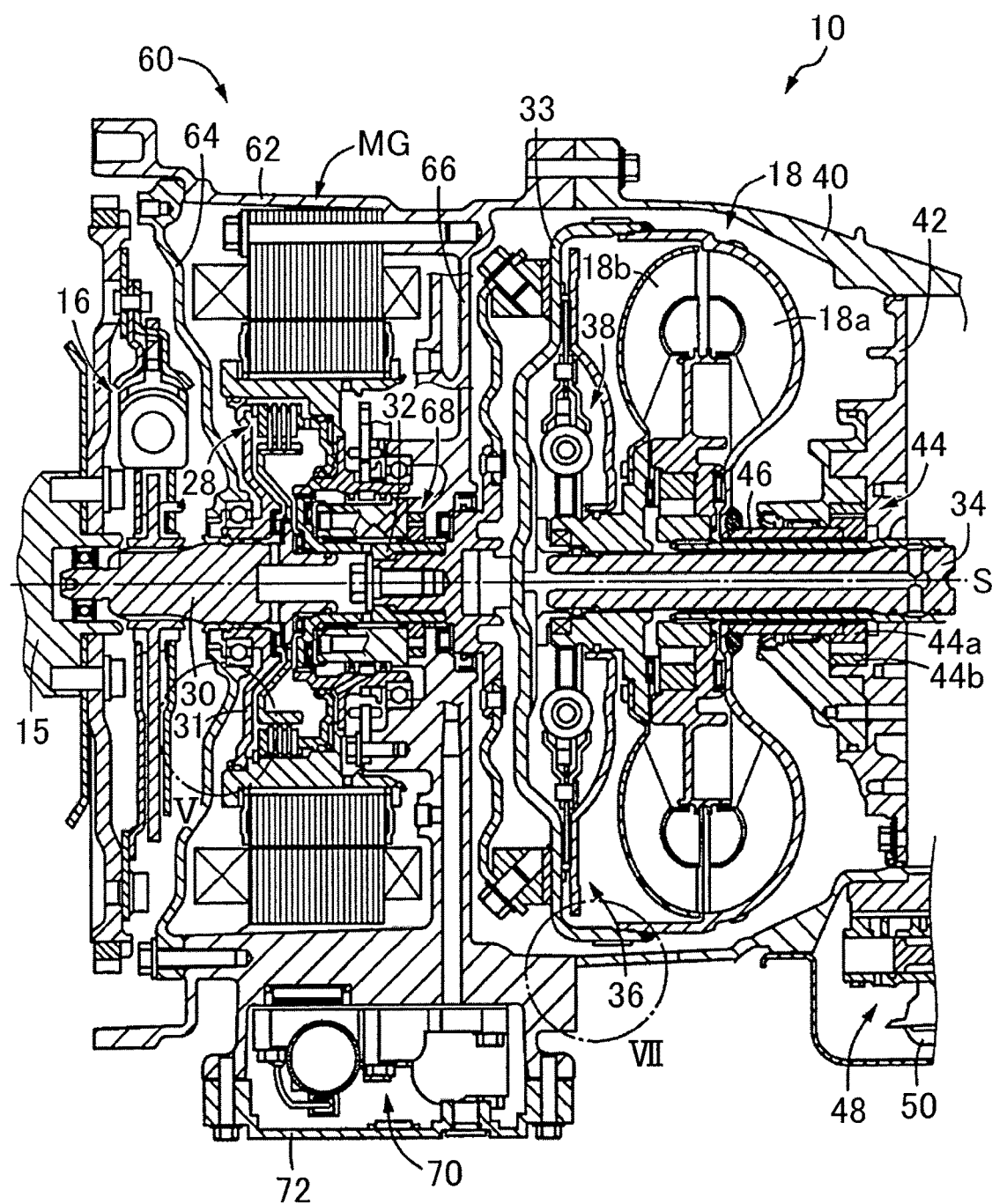
FIG. 2 is a sectional view specifically showing a structure near a motor generator MG and a torque converter of the power transmission system according to the first embodiment of the present invention.

FIG. 2 is a sectional view specifically showing a structure of a main part of the power transmission system 10, in other words, an area near the motor generator MG and the torque converter 18. The torque converter 18 and the transmission 20 are housed in a first case 40. An intermediate partition 42, which separates the torque converter 18 and the transmission 20, is provided integrally with the first case 40, and the input shaft 34 is inserted through a center part of the intermediate partition 42 so that the input shaft 34 is able to rotate. In an inner peripheral part of the intermediate partition 42, a first oil pump 44 is provided concentrically with a shaft center S of the power transmission system 10. The first oil pump 44 is an internal gear pump that generates hydraulic pressure as an outer rotor 44b is rotated eccentrically with respect to an inner rotor 44a. The inner rotor 44a is connected to the pump impeller 18a through a cylindrical connecting member 46 so that the inner rotor 44a is unable to rotate relative to the pump impeller 18a, and the inner rotor 44a is always able to be driven and rotated by the motor generator MG.

Figure 3:
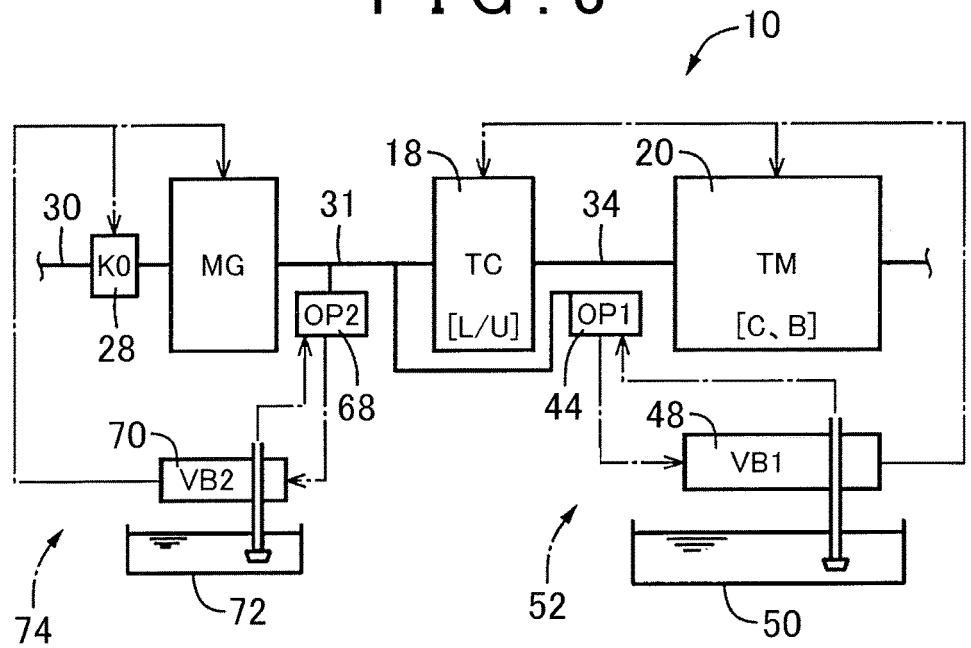
FIG. 3 is a block diagram for explaining a hydraulic circuit provided in the power transmission system according to the first embodiment of the present invention.

A first valve body 48 and a first oil pan 50 are provided integrally with a lower end part of the first case 40. The first valve body 48 includes various types of switching valves, hydraulic control valves, and so on for controlling gear shift of the transmission 20 and for controlling engagement and disengagement of the lock-up clutch 36, and also includes a circuit for lubricating and cooling each part such as the transmission 20 and a bearing, or supplying oil to the torque converter 18. In other words, as shown in a block diagram of a hydraulic circuit in FIG. 3, a first hydraulic circuit 52 is provided in association with the first oil pump (OP1) 44. In the first hydraulic circuit 52, oil pumped up by the first oil pump 44 from the first oil pan 50 is first supplied to the first valve body (VB1) 48, and then supplied to the torque converter (TC) 18 and the transmission (TM) 20 from the first valve body 48. Thus, operations of the torque converter (TC) 18 and the transmission (TM) 20 are controlled, and the oil is used for lubricating and cooling each part. The first hydraulic circuit 52 is structured by using an oil passage provided in members in different parts, such as the first case 40, the intermediate partition 42, and the input shaft 34. The first hydraulic circuit 52 is an example only, and it is not necessarily required to supply oil discharged from the first oil pump 44 entirely to the first valve body 48. Therefore, various deformations may be possible. For example, a part of the oil may be supplied as it is to lubrication parts for lubrication and cooling. In FIG. 3, "L/U" shown inside the torque converter (TC) 18 in FIG. 3 is the lock-up clutch 36, and "C, B" shown inside the transmission (TM) 20 is the clutches and the brakes for gear shift control.

Basically, the torque converter 18, the transmission 20, the first hydraulic circuit 52, and so on are structured similarly to those in an conventional engine drive vehicle that does not include the module for a hybrid vehicle 60 structured based on the motor generator MG and the K0 clutch 28. In other words, the torque converter, the transmission, the first hydraulic circuit, and so on of the conventional engine drive vehicle may be used almost as they are without needing large design changes.

Meanwhile, the module for hybrid vehicle 60 is a part that is newly added for hybridization of a vehicle, and the motor generator MG and the K0 clutch 28 are housed in a second case 62 that is integrally fixed to the first case 40 through a plurality of bolts. The K0 clutch 28 is arranged in an inner peripheral part of a rotor of the motor generator MG. A first partition 64, which is structured separately, is integrally fixed to the second case 62 through a plurality of bolts in order to separate off the damper gear 16 on the engine 14 side, and the first connecting shaft 30 is inserted through a center part of the first partition 64 so that the first connecting shaft 30 is able to rotate. A second partition 66 is also provided integrally with the second case 62 on the opposite side of the first partition 64, in other words, the torque converter 18 side, in order to separate off the torque converter 18, and a second connecting shaft 32 is inserted through a center part of the second partition 66 so that the second connecting shaft 32 is able to rotate. In an inner peripheral part of the second partition 66, a second oil pump 68 is provided concentrically with the shaft center S of the power transmission system 10. The inner peripheral part of the second partition 66 projects to the motor generator MG side (to the left in the drawing). In the first embodiment, the second oil pump 68 is arranged in an inner peripheral part of a coil of the motor generator MG so that at least a part of the second oil pump 68 overlaps the motor generator MG in an axis direction of the motor generator MG. The second oil pump 68 is an internal gear pump that generates hydraulic pressure as an outer rotor is eccentrically rotated with respect to an inner rotor, similarly to the first oil pump 44. The inner rotor is connected to the second connecting shaft 32 by spline or the like, so that the inner rotor is unable to rotate relative to the second connecting shaft 32, and the inner rotor is always be able to be driven and rotated by the motor generator MG.

A second valve body 70 and a second oil pan 72 are arranged integrally with a lower end part of the second case 62. The second valve body 70 includes various types of switching valves, hydraulic control valves and so on for controlling engagement and disengagement of the K0 clutch 28, and has a circuit for supplying oil for lubricating and cooling each part such as the K0 clutch 28, the motor generator MG, and a bearing. In other words, as shown in the block diagram of the hydraulic circuit in FIG. 3, a second hydraulic circuit 74 is provided in association with the second oil pump (OP2) 68. The second hydraulic circuit 74 is structured to be completely separated and independent from the first hydraulic circuit 52. Oil pumped up by the second oil pump 68 from the second oil pan 72 is first supplied to the second valve body (VB2) 70, and then supplied to the K0 clutch 28 and the motor generator MG from the second valve body 70. Thus, an operation of the K0 clutch 28 is controlled, and the oil is used for lubricating and cooling each part. The second hydraulic circuit 74 is an example only, and it is not necessarily required to supply the oil discharged from the second oil pump 68 entirely to the second valve body 70. Therefore, various deformations may be possible. For example, a part of the oil may be supplied as it is to lubrication parts for lubrication and cooling. The second hydraulic circuit 74 is structured by using an oil passage provided in members in different parts, such as the second case 62, the second partition 66, the first connecting shaft 30, and the second connecting shaft 32.

In the above-mentioned power transmission system 10 for a hybrid vehicle according to the first embodiment of the present invention, the first oil pump 44 for supplying oil to the transmission 20 and the torque converter 18, and the second oil pump 68 for supplying oil to the motor generator MG and the K0 clutch 28, are provided separately. Therefore, the first hydraulic circuit 52, which supplies oil to the transmission 20 and the torque converter 18 from the first oil pump 44, and the second hydraulic circuit 74, which supplies oil to the motor generator MG and the K0 clutch 28 from the second oil pump 68, are able to be structured separately and independently from each other. Thus, a degree of design freedom for the hydraulic circuits 52, 74 is expanded, which makes it possible to design the module for hybrid vehicle 60 having the motor generator MG and the K0 clutch 28, as well as the second hydraulic circuit 74, separately and independently. Thus, workability is improved when assembling the module for hybrid vehicle 60 to the transmission 20 including the torque converter 18. Design changes of a conventional transmission are not needed or greatly reduced, and hybridization is easily applied to various types of transmissions.

Since the second oil pump 68 is connected to the motor generator MG, and driven and rotated by the motor generator MG, hydraulic pressure is generated even in a state where the K0 clutch 28 is disengaged and the engine 14 is separated. Further, compared to a case where a large-sized electric oil pump having a dedicated electric motor is provided, not only costs are reduced substantially, but the power transmission system 10 is downsized and very easily mounted, is able to ensure generation of hydraulic pressure even at low temperature, and is highly reliable as a possibility of failures due to disconnection and so on is reduced.

Further, since the second oil pump 68 is provided at a position where the second oil pump 68 overlaps the motor generator MG in the axis direction of the motor generator MG, an increase in axial dimension is prevented.

Next, a second embodiment of the present invention will be explained. In the explanation below, parts that are substantially common with the first embodiment will be denoted by the same reference numerals to omit detailed explanation.

Figure 4:
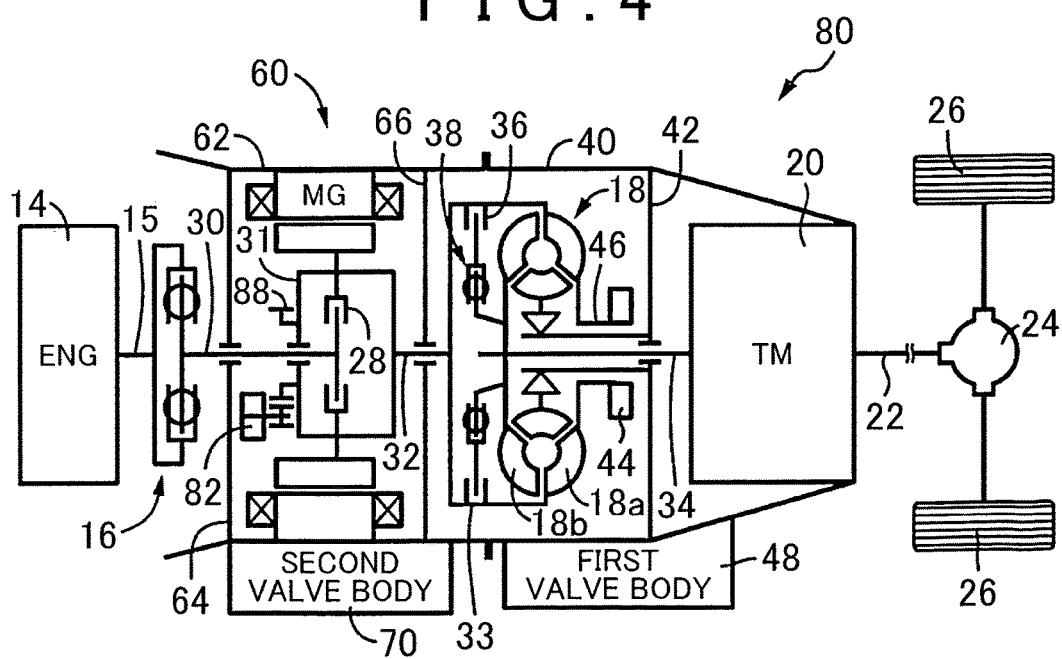
FIG. 4 is an outline view for explaining a rough structure of a power transmission system for a hybrid vehicle according to a second embodiment of the present invention.
Figure 5:
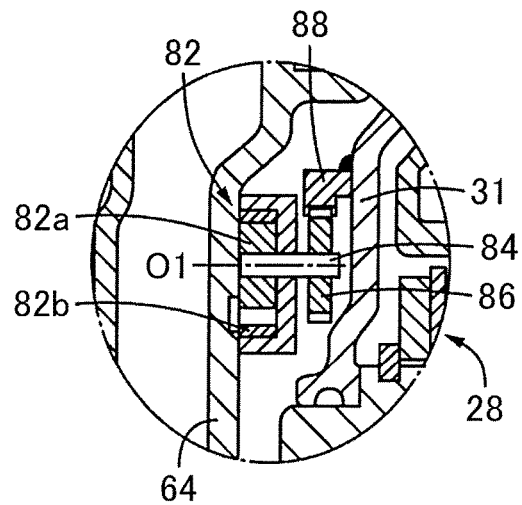
FIG. 5 is a view specifically showing a second oil pump according to the second embodiment of the present invention, and is an enlarged sectional view of a part corresponding to the V part in FIG. 2.

In the first embodiment, the second oil pump 68 is arranged in the inner peripheral part of the second partition 66. However, like a power transmission system 80 shown in FIG. 4 and FIG. 5, it is possible to arrange a second oil pump 82 in a radially intermediate part of a first partition 64. FIG. 5 is an enlarged sectional view of a part corresponding to the V part in FIG. 2. The second oil pump 82 is an internal gear pump similar to the second oil pump 68, and generates hydraulic pressure as an outer rotor 82b is rotated eccentrically with respect to an inner rotor 82a. The second oil pump 82 is arranged on a central line O1 defined at a position parallel to and away from a shaft center S of the power transmission system 80. A driven gear 86 is provided in a rotating shaft 84 of the inner rotor 82a. A drive gear 88 provided in a support plate 31 enables the driven gear 86 to be always driven and rotated by the motor generator MG. The drive gear 88 is integrally fixed to the support plate 31 by fixing means such as welding. The second oil pump 82 is arranged in an inner peripheral part of a coil of the motor generator MG so that at least a part of the second oil pump 82 overlaps the motor generator MG in an axis direction of the motor generator MG. An oil passage that structures a second hydraulic circuit 74 is arranged in the first partition 64 in which the second oil pump 82 is arranged. In the second embodiment, effects that are substantially the same as those in the first embodiment are obtained. In this example, the second oil pump 82 is provided on an axis that is different from the shaft center S. However, the second oil pump 82 may be provided coaxially with the shaft center S like the first embodiment.

Figure 6:
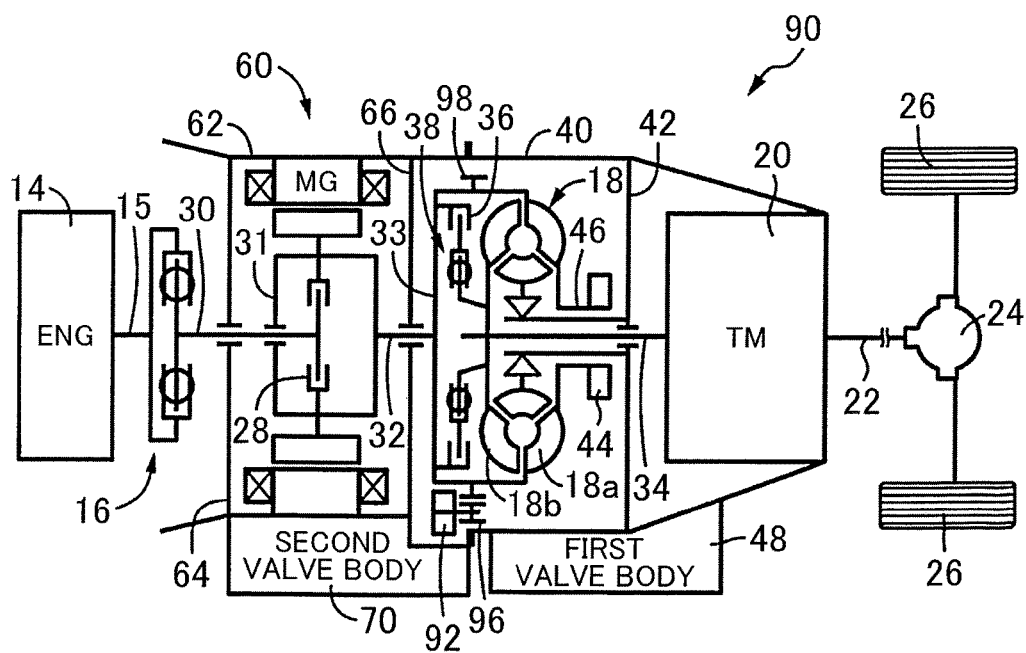
FIG. 6 is an outline view for explaining a rough structure of a power transmission system for a hybrid vehicle according to a third embodiment of the present invention.
Figure 7:
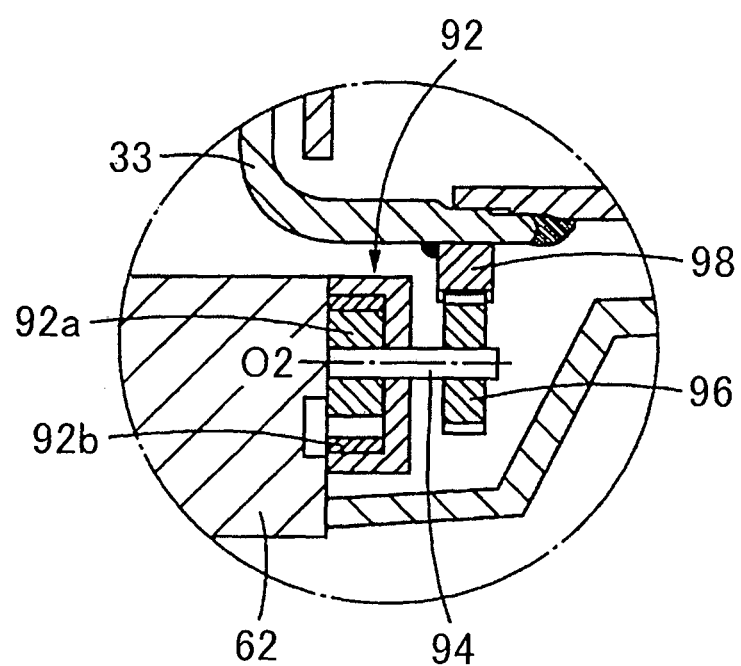
FIG. 7 is a view specifically showing a second oil pump according to the third embodiment of the present invention, and is an enlarged sectional view of a part corresponding to the VII part in FIG. 2.

Next, a third embodiment of the present invention will be explained. In the explanation below, parts that are substantially common with those in the first embodiment will be denoted by the same reference numerals to avoid detailed explanation. In the third embodiment, like a power transmission system 90 shown in FIG. 6 and FIG. 7, a second oil pump 92 is provided in a second case 62. FIG. 7 is an enlarged sectional view of a part corresponding to the VII part in FIG. 2. The second oil pump 92 is also an internal gear pump that generates hydraulic pressure as an outer rotor 92b is eccentrically rotated with respect to an inner rotor 92a, and is arranged on a central line O2 defined at a position parallel to and separated from a shaft center S of the power transmission system 90. A driven gear 96 is provided in a rotating shaft 94 of the inner rotor 92a. A drive gear 98 provided in a TC housing 33 enables the driven gear 96 to be always driven and rotated by the motor generator MG. The drive gear 98 is arranged in the TC housing 33 by fixing means such as a spline and welding, so that the drive gear 98 is unable to rotate relative to the TC housing 33. The second oil pump 92 is arranged on an outer peripheral part of the TC housing 33 so that at least a part of the second oil pump 92 overlaps the torque converter 18 in an axis direction of the torque converter 18. In the third embodiment, the second oil pump 92 is also provided at a position where the second oil pump 92 overlaps the torque converter 18 in the axis direction of the torque converter 18. Therefore, similar effects to those in the second embodiment are obtained, such as prevention of an increase in an axial dimension. Although it is necessary to provide the drive gear 98 in the TC housing 33, large design changes are not necessary, and it is possible to use the torque converter for a conventional engine drive vehicle almost as it is.

The embodiments of the present invention have been explained in detail based on the drawings. However, the embodiments are examples only, and the present invention may be carried out in forms where various changes and improvements are added based on knowledge of those skilled in the art.

A motor generator, which is also usable as a generator, is preferably used as the foregoing motor. With or without a function of a generator, the motor may be structured so as to supply oil to parts such as coil parts and bearing parts for cooling and lubrication. For the transmission between the motor and the driving wheel, an automatic transmission is preferably used, which is able to switch transmission gear ratios automatically in accordance with a driving state, such as vehicle speed and an accelerator operation amount. The transmission may be a manual transmission in which a driver is able to change a transmission gear ratio manually. The transmission may also be a stepped transmission such as a planetary gear type transmission, in which transmission gear ratios (gears) are switched by a plurality of clutches and brakes, or a continuously variable transmission such as a belt-type transmission that is able to continuously change a transmission gear ratio. These transmissions need oil to be supplied to frictional engagement parts, bearing parts, and so on for lubrication and cooling. For the automatic transmission, a transmission that controls gear shift by hydraulic pressure is widely used. Oil may be supplied to the transmission for lubrication and cooling, for controlling gear shift, or both.

The clutch connects and disconnects a power transmission, and separates an engine off from the power transmission path. A frictional engagement device such as a hydraulic clutch is preferably used. In this type of hydraulic frictional engagement device, power transmission is connected and disconnected as the hydraulic frictional engagement device is engaged and disengaged by hydraulic pressure, and oil is supplied as necessary to a frictional engagement part and so on for lubrication and cooling. Oil may be supplied to the clutch for lubrication and cooling, for controlling connection and disconnection, or both.

As the first oil pump and the second oil pump, internal gear pumps are used preferably, in which an outer rotor is eccentrically rotated with respect to an inner rotor. As the first oil pump and the second oil pump, other oil pumps, such as external gear pumps, may be employed. For example, the oil pumps are arranged coaxially with the motor. The oil pumps may be arranged on other shaft center parallel to the shaft center of the motor. The oil pumps may be arranged on a shaft center perpendicular to the shaft center of the motor. Various forms of arrangement are possible for the oil pumps.

The first oil pump is provided in, for example, the first case (including a partition and so on integrally fixed to the first case) in which the transmission is housed, and the first hydraulic circuit that supplies oil to the transmission includes an oil passage provided in the first case and so on. The second oil pump is provided in, for example, a second case (including a partition and so on integrally fixed to the second case) in which the motor and the clutch are housed, and the second hydraulic circuit that supplies oil to the motor and the clutch includes an oil passage provided in the second case and so on. The first hydraulic circuit and the second hydraulic circuit are structured separately and independently from each other. It is preferred that the module for hybrid vehicle having the motor and the clutch is structured by integrally providing the second case, the second hydraulic circuit, the valve body that switches the hydraulic circuit, the oil pan, and so on.

In a case where the torque converter is arranged between the transmission and the motor, it is only necessary to have a structure in which oil is supplied to the torque converter from the first oil pump, similarly to the conventional art. In a case where the torque converter has the lock-up clutch, the lock-up clutch is structured so as to be engaged and disengaged by hydraulic pressure supplied by the first oil pump through the valve body. Generally, the first oil pump is arranged so as to be connected to the pump impeller of the torque converter and driven and rotated by the torque converter. However, when there is no torque converter, a structure is desired in which the first oil pump is connected to the motor so as to allow power transmission, and is able to be driven and rotated by the motor.

The second oil pump may be connected to the motor so as to allow power transmission, and always be driven and rotated by the motor. The second oil pump may also be arranged on the engine side of the clutch, so that the second oil pump is driven and rotated by the engine. If there is a room in a mounting space, an electric oil pump having a dedicated electric motor may be used.

The invention claimed is:

1. A power transmission system for a hybrid vehicle, the power transmission system comprising:
   a transmission;
   a clutch;
   a motor connected to a driving wheel through the transmission;
   an engine connected to the motor through the clutch;
   a first oil pump that supplies oil to the transmission;
   a second oil pump that supplies oil to the motor and the clutch;
   a first case that houses the first oil pump and the transmission;

a second case that houses the second oil pump, the clutch and the motor;

a first hydraulic circuit in which the first oil pump is provided, the first hydraulic circuit including a first valve body configured to switch an oil passage of the first hydraulic circuit and a first oil pan, the first valve body and the first oil pan being provided in the first case; and a second hydraulic circuit in which the second oil pump is provided, the second hydraulic circuit being independent from the first hydraulic circuit, the second hydraulic circuit including a second valve body configured to switch an oil passage of the second hydraulic circuit and a second oil pan, the second valve body and the second oil pan being provided in the second case.

2. The power transmission system according to claim 1, wherein the second oil pump is connected to the motor and is driven by the motor.

3. The power transmission system according to claim 1, wherein the second oil pump is provided at a position where at least a part of the second oil pump overlaps the motor in an axis direction of the motor.

4. The power transmission system according to claim 1, further comprising a torque converter provided between the motor and the transmission, wherein the second oil pump is provided at a position where at least a part of the second oil pump overlaps the torque converter in an axis direction of the torque converter.

* * * * *